(12) United States Patent
Talbert et al.

(10) Patent No.: US 11,949,554 B2
(45) Date of Patent: Apr. 2, 2024

(54) SYSTEMS AND METHODS FOR MODULAR IN-PREMISES EQUIPMENT

(71) Applicant: Verizon Patent and Licensing Inc., Basking Ridge, NJ (US)

(72) Inventors: Michael Talbert, Nazareth, PA (US); Meaghan Leong, Cohasset, MA (US); Christina L. Fyock, Sudbury, MA (US); Aldrich Gamboa, Bridgewater, NJ (US); Christopher M. Schmidt, Branchburg, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 274 days.

(21) Appl. No.: 17/249,807

(22) Filed: Mar. 15, 2021

(65) Prior Publication Data

US 2021/0203552 A1 Jul. 1, 2021

Related U.S. Application Data

(62) Division of application No. 16/109,060, filed on Aug. 22, 2018, now Pat. No. 10,972,339.

(51) Int. Cl.
*H04L 41/0806* (2022.01)
*H04W 84/12* (2009.01)

(52) U.S. Cl.
CPC ........ *H04L 41/0806* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 6,477,357 B1 * | 11/2002 | Cook | H04M 1/0202 361/814 |
| 2011/0316164 A1 * | 12/2011 | Liao | H01L 29/0657 257/784 |
| 2012/0287864 A1 | 11/2012 | Sun | |
| 2014/0093211 A1 * | 4/2014 | McColloch | G02B 6/406 385/74 |
| 2015/0234398 A1 * | 8/2015 | Harris | B25J 5/00 700/250 |
| 2017/0238436 A1 * | 8/2017 | Deros | H02M 7/003 361/731 |
| 2018/0054840 A1 * | 2/2018 | Fitch | H04W 76/10 |
| 2018/0139708 A1 * | 5/2018 | Zhan | H04L 12/413 |

* cited by examiner

*Primary Examiner* — Adnan Baig

(57) ABSTRACT

A CPE device may include a plurality of CPE modules implemented in hardware. The plurality of CPE modules may include a first module and a second module. The first module and the second module may be arrangeable in a stacked configuration. The first module may include a first interconnection interface component disposed on a top surface of the first module. The second module may include a second interconnection interface component disposed on a bottom surface of the second module. The second interconnection interface component may be configured to complementarily couple to the first interconnection interface component when the first module and the second module are arranged in the stacked configuration.

20 Claims, 14 Drawing Sheets

Examples of CPE Modules and Configurations

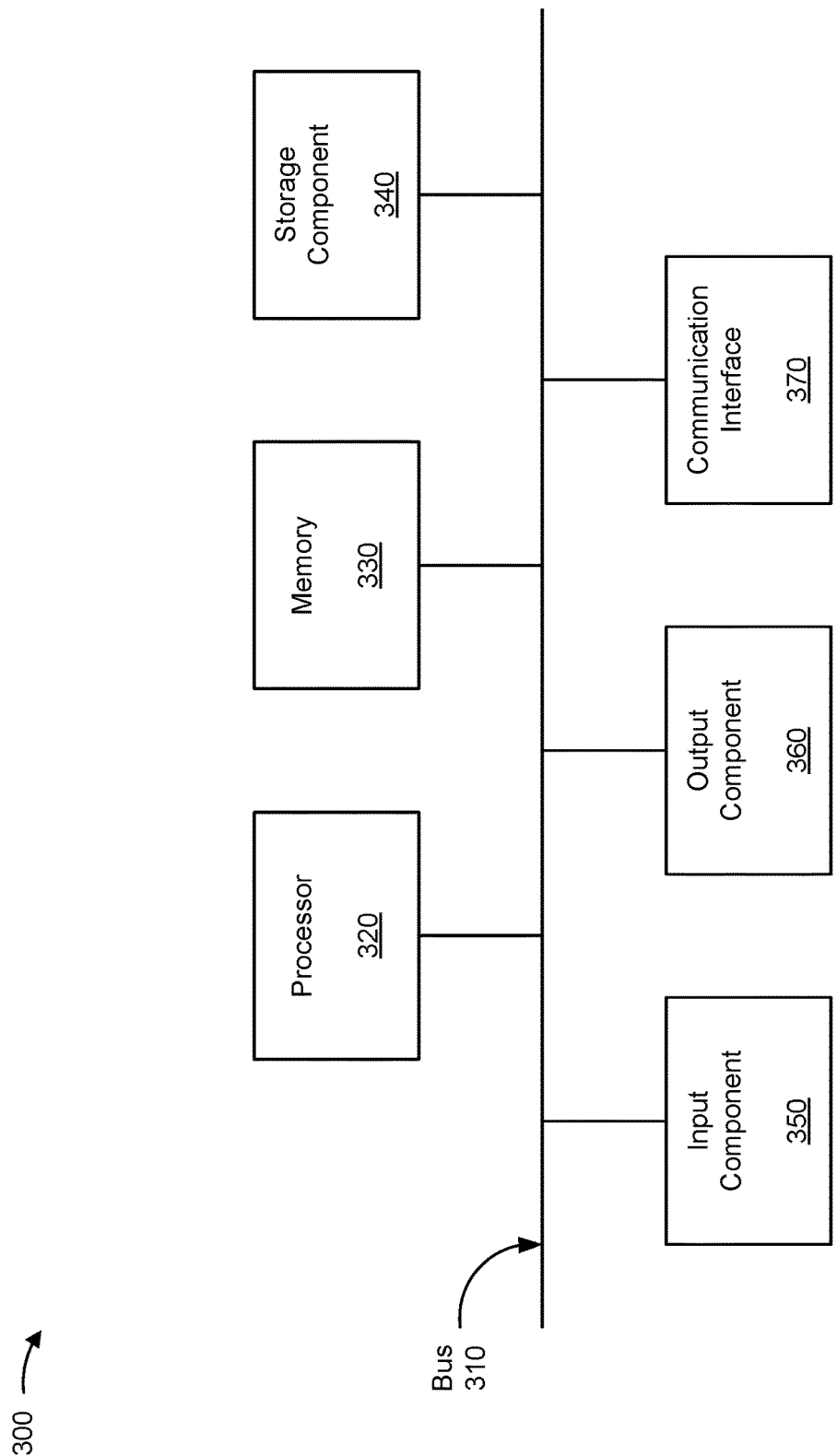

SYSTEMS AND METHODS FOR MODULAR IN-PREMISES EQUIPMENT

RELATED APPLICATION

This application is a divisional of U.S. patent application Ser. No. 16/109,060, entitled "SYSTEMS AND METHODS FOR MODULAR IN-PREMISES EQUIPMENT," filed Aug. 22, 2018, which is incorporated herein by reference.

BACKGROUND

A local area network (LAN) may include a group of computing devices that are connected to one another in a limited area. A wide area network (WAN) may include a group of computing devices that connect multiple LANs so as to form a large geographic network. A WAN implementation may include, for example, a Fourth Generation (4G) network, a Fifth Generation (5G) network, a Passive Optical Network (PON), a Next Generation Passive Optical Network (NGPON), an NGPON 2, a Narrowband Internet-of-Things (NB-IoT) network, a low power wide area network (e.g., a Long-Term Evolution Category M1 (LTE Cat-M1)-based network), and/or another next generation network.

BRIEF DESCRIPTION OF THE DRAWINGS

FIG. 3 is a diagram of example components of one or more devices of FIG. 2.

DETAILED DESCRIPTION OF PREFERRED EMBODIMENTS

Figure 1A:
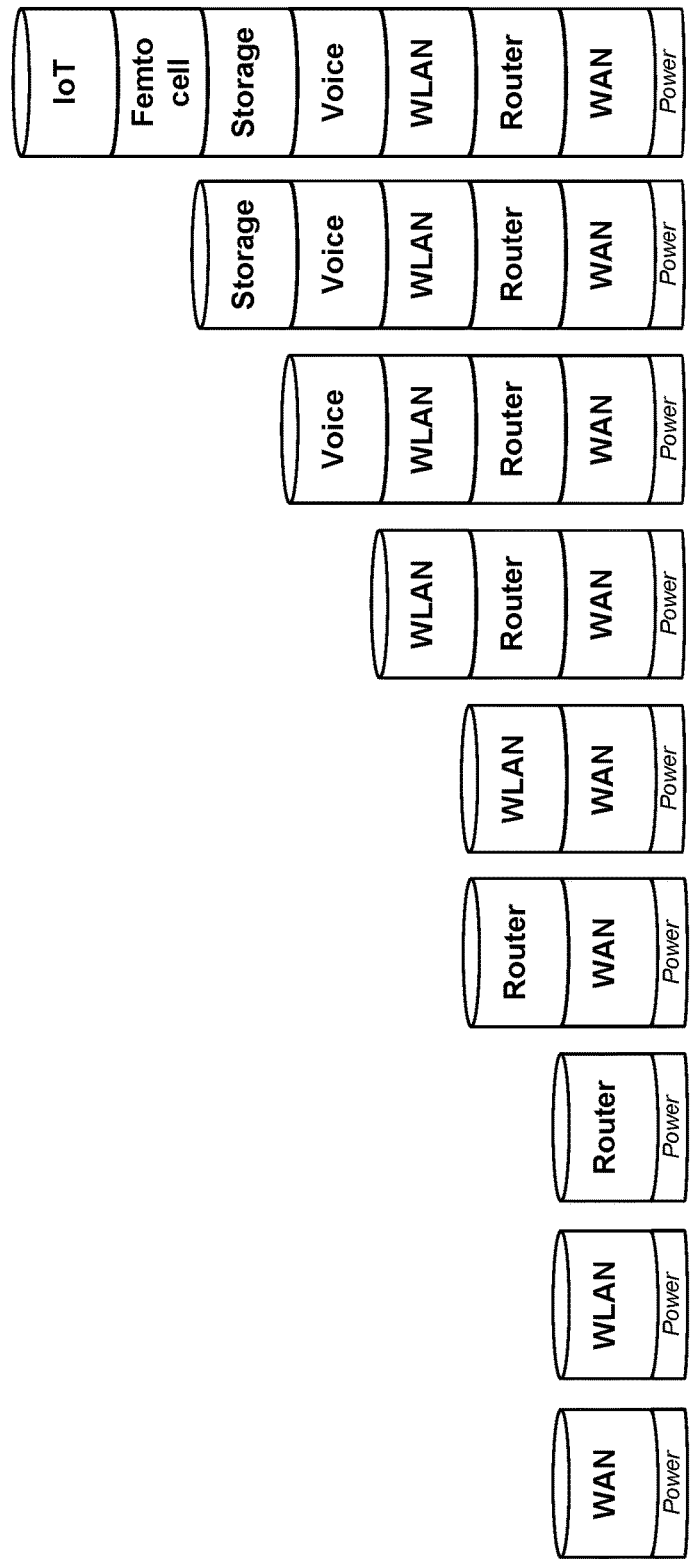
FIGS. 1A-1L are diagrams of an example implementation described herein.

The following detailed description of example implementations refers to the accompanying drawings. The same reference numbers in different drawings may identify the same or similar elements.

Currently, a network service provider may provide different WAN solutions or implementations, for different types of subscribers or customers (e.g., residential customers, small business customers, medium-sized business customers, and/or the like), using a variety of types of network equipment. For example, a router, provided to a subscriber located in a multiple dwelling unit (MDU), or to a small business subscriber or a medium-sized business subscriber, may be equipped with self-organizing network (SON) functionality, whereas a router, provided to a subscriber in a small residential home, may not be equipped with such functionality. As another example, a modem, provided to a small business subscriber or a medium-sized business subscriber, may be configured for use with an NGPON 2, whereas a modem, provided to a subscriber in a multiple dwelling unit or a residential home, may be configured for use with a different type of PON. A network service provider thus needs to manage, and deploy, a large and diverse inventory of network equipment across different service segments. Additionally, existing network equipment typically provide functionality for services that subscribers may not need or may not be subscribed to.

Some implementations, described herein, provide a modular customer premises equipment (CPE) device or system (e.g., a network equipment system) capable of being adapted for use with a variety of WAN solutions. In some implementations, the CPE device may include multiple modules, implemented in hardware, and arranged (e.g., in various permutations) singularly or in a stack to form a homogeneous, or substantially homogenous, CPE device configuration or installation. In some implementations, the modules may include a router module, a WAN module, a WLAN module (e.g., a Wi-Fi module and/or the like), and/or one or more other modules configured to provide other network-based functionality (e.g., a femtocell module, a voice module, a storage module, an Internet-of-Things (IoT) module, and/or the like). In some implementations, certain modules (e.g., WLAN modules and/or the like) may be utilized as standalone modules to form a distributed network in a subscriber's premises.

In this way, a network service provider may utilize a converged solution for WAN implementations across multiple service segments (including, for example, fiber optic-based Internet service, 5G fixed wireless service, network services for small companies and/or medium-sized companies, and/or the like). In addition to providing an aesthetically-pleasing, in-premises network equipment system configuration, a modular approach, as described herein, also permits customized configurations that more effectively tailor to the needs of subscribers in different service segments. For example, a CPE device configuration may include only the modules needed by a particular subscriber (e.g., based on services to which the particular customer is subscribed), which provides more efficient and reliable network system implementations over existing approaches, where a subscriber may be provided with functionality for services to which the subscriber is not subscribed or may never use. This also permits a network service provider to offer flexible options for different network service installations, which improves overall market penetration for the network service provider.

Modularity in network equipment design also provides economies of scale that flexibly accommodate a wide range of subscriber needs. For example, providing a particular type of network functionality, to different subscribers in different service segments, via the same module (rather than via different devices dedicated for different service segments, as is done in existing approaches), reduces network equipment variations, which simplifies, and improves the efficiency of, equipment inventory tracking, management, support, and deployment. Providing a modular CPE device, as described herein, also affords a network service provider with more flexibility in managing the life cycle of the various modules, including updating and/or replacing individual modules to keep up to date with advancing technologies, which also improves equipment maintenance and upgrade cycles. Modularity in network equipment design also permits a network service provider to develop, and utilize, a common business support system (BSS), a common operations support system (OSS), a common telemetry solution, and/or a common surveillance solution, across all service segments, which promotes synergy between service segment operations, thereby improving the overall efficiency and reliability of the network service provider's systems.

FIGS. 1A-1L are diagrams of an example implementation 100 described herein. FIG. 1A is a conceptual diagram illustrating example CPE device configurations that include a variety of modules. Each module may include a housing and hardware circuitry enclosed in the housing. As shown in FIG. 1A, an example CPE device configuration may include one or more of a WAN module, a router module, a WLAN module (e.g., a Wi-Fi module, such as a Wi-Fi access point), a voice module, a storage module, a femtocell module, or an Internet of Things (IoT) module.

As shown in FIG. 1A, various modules may be disposed individually or as standalone modules, or, alternatively, aligned directly on top of one another so as to form a stack. In various implementations, the modules (e.g., the housings of the modules) may be designed to have a particular shape, color and/or certain dimensions (e.g., a certain width, a certain circumference, a certain height, a certain length, and/or the like) such that the modules, when stacked upon one another, form a homogeneous, or substantially homogeneous, structure that is orderly, easily identifiable (e.g., based on color, shape, etc.), and aesthetically-pleasing. In various implementations, and as shown in FIG. 1A, for example, a power base may be included to provide electrical power to the modules (e.g., whether to a standalone module or to modules in a stack).

Figure 1B:
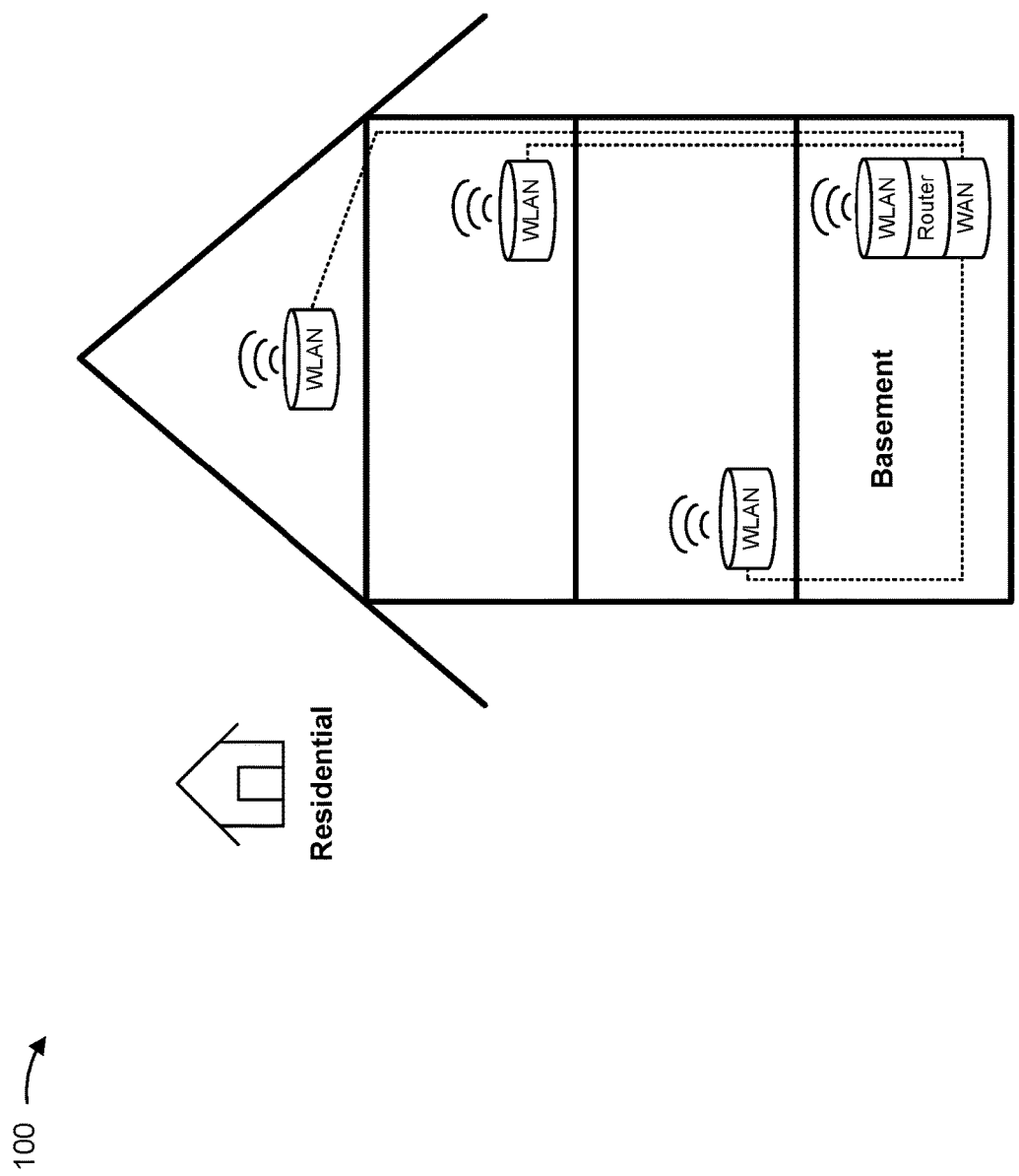
Figure 1C:
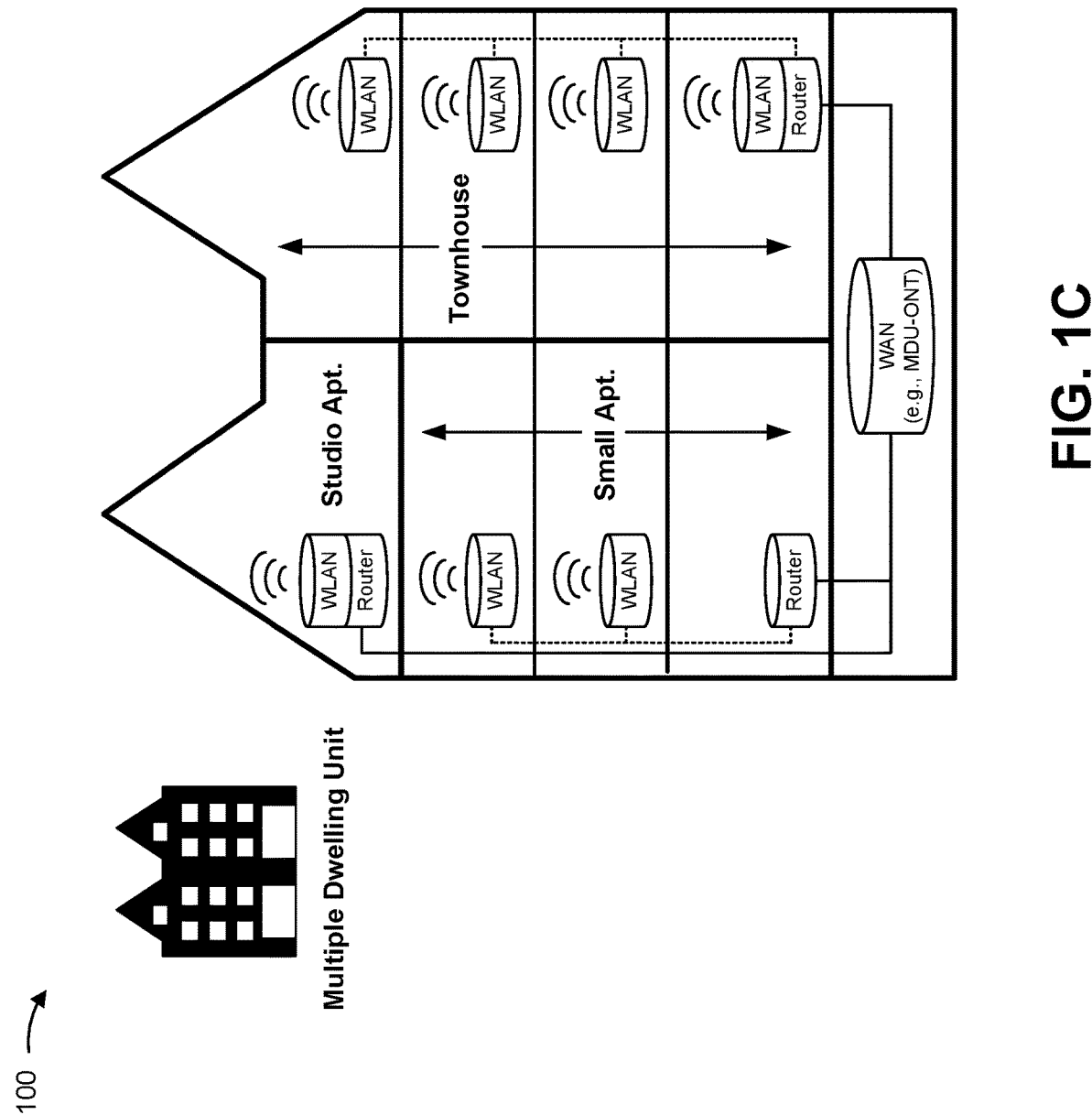
Figure 1D:
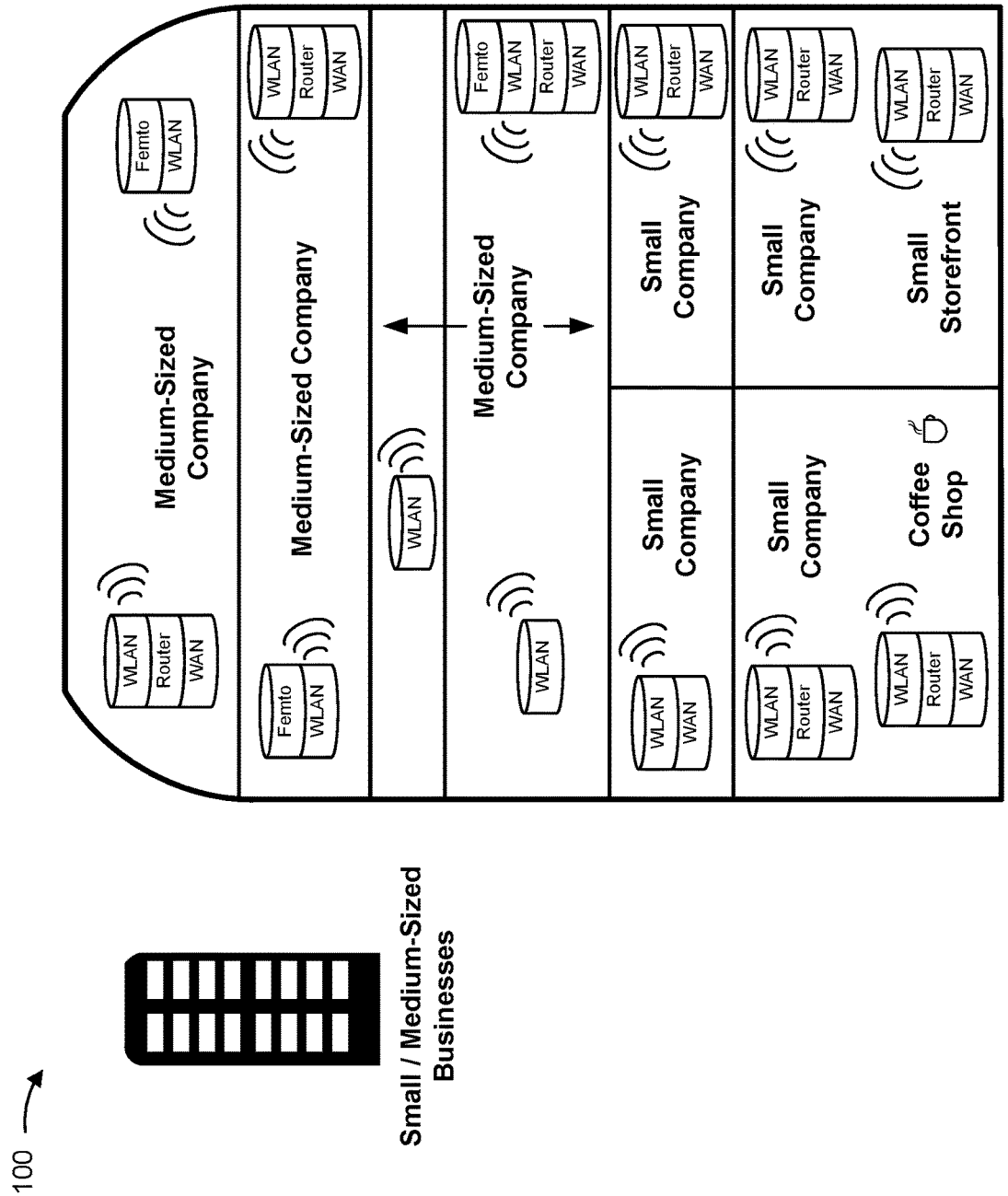

FIGS. 1B-1D are diagrams showing example CPE device configurations for different customers across multiple service segments. As shown in FIG. 1B, a CPE device, in a residential home, may include multiple modules arranged in a stack, including a router module, a WAN module, and a WLAN module, and multiple standalone WLAN modules located in various areas of a residential home. As shown in FIG. 1C, an example CPE device, in a studio within a multiple dwelling unit, may include only a router module and a WLAN module arranged in a stack. As further shown in FIG. 1C, an example CPE device, in a small residential apartment within the multiple dwelling unit, on multiple floors, may include a router module and multiple standalone WLAN modules, and another example CPE device, in a townhouse within the multiple dwelling unit, may include a router module and a WLAN module arranged in a stack, and multiple standalone WLAN modules located in various areas of the townhouse. As shown in FIG. 1D, an example CPE device, for small companies and medium-sized companies throughout a business building, may similarly include various modules, such as a router module, a WLAN module, and/or a femtocell module arranged in a stack and one or more standalone WLAN modules. In this way, different modules may be mixed and matched, in a particular subscriber's premises, depending on the subscriber's network service needs.

Although FIGS. 1A-1D show modules having a particular shape (e.g., a cylindrical shape), a module may have any other shape (e.g., a box-like shape, a diamond-like shape, and/or the like). Further, in some implementations, a first module may have a shape defining an inner hole (e.g., a toroid-like shape and/or the like), and a second module may have a shape that corresponds to the inner hole (e.g., a circular shape and/or the like) such that the second module may be disposed in the inner hole.

In some implementations, a module may be configured to operate when the module is arranged with other modules in a stack, and additionally, or alternatively, when positioned as a standalone module (e.g., located separately from other modules of a stack). For example, in some implementations, a WLAN module, a femtocell module, an IoT module, and/or the like may be configured to operate when such a module is arranged with other modules of a stack, and additionally, when such a module is positioned as a standalone module. Permitting modules to operate as standalone devices allows a subscriber to configure a distributed network (e.g., a distributed Wi-Fi network) throughout the subscriber's premises as needed.

In some implementations, the modules may be configured with one or more mechanisms (e.g., clips, snaps, adhesives, screws, bolts, and/or the like) that secure the modules to one another when the modules are arranged in a stack. This enables a CPE device configuration that is securely connected to be childproof, robust, and reliable, when installed.

Figure 1E:
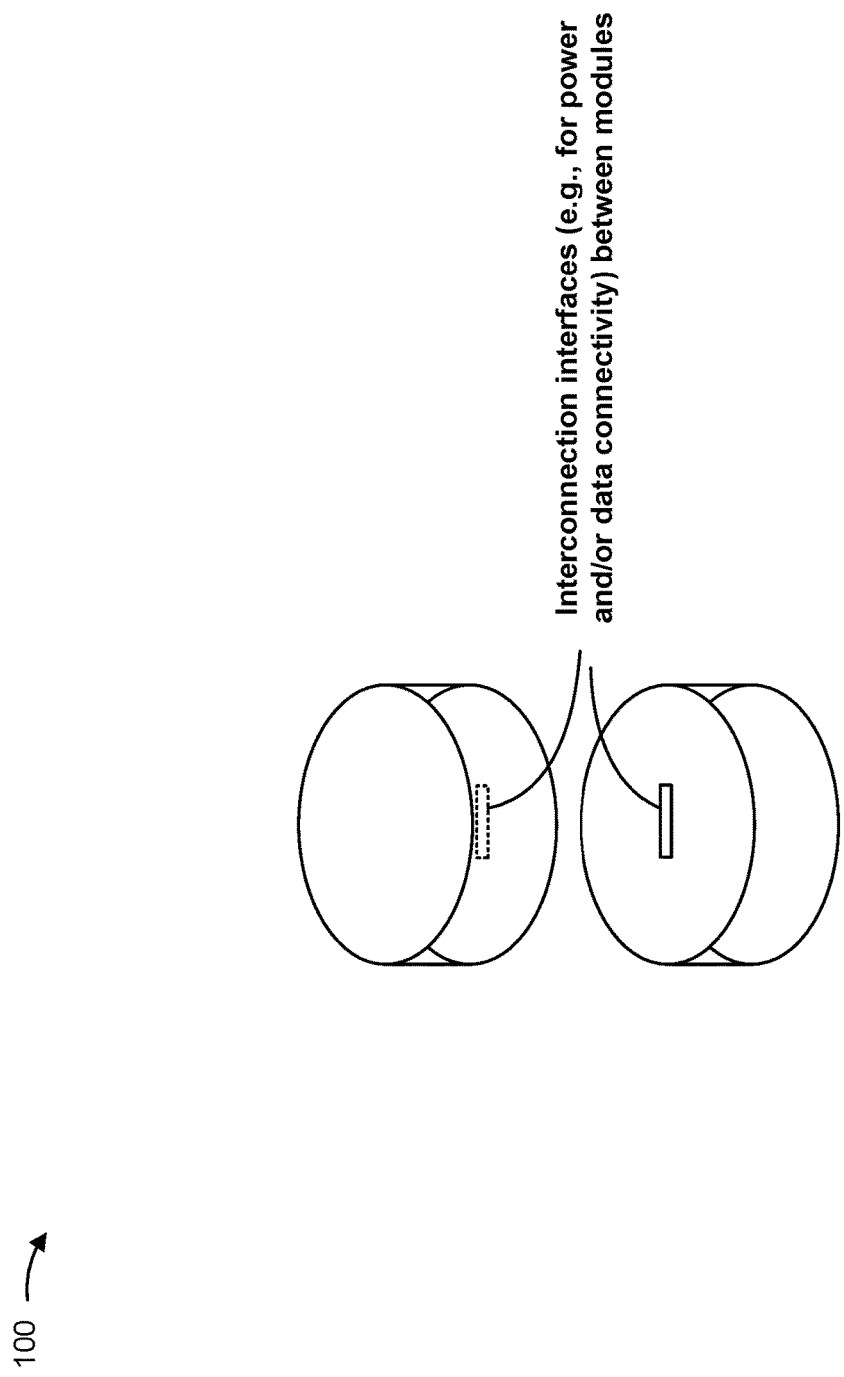

In some implementations, the modules may be configured to share electrical power, and establish data connectivity with one another, when the modules are arranged in a stack. FIG. 1E is a diagram of example modules configured with complementary interconnection interface components that provide module-to-module, electrical power transfer and/or data connectivity. In some implementations, the complementary interconnection interface components may be implemented between modules in a through-the-stack manner. This minimizes a quantity of wires needed for and/or between modules, which provides for an elegant and aesthetically-pleasing CPE device configuration.

For example, in some implementations, a first module may include a first interconnection interface component (e.g., a male component or a female component) disposed in an area on a topside, or top surface, of the first module, and configured to provide electrical power and/or data connectivity (e.g., via a connection to a power source and/or a connection to a data communication component), and a second module may include a second interconnection interface component (e.g., a female component if the first interconnection interface component is a male component, or a male component if the first interconnection interface component is a female component) disposed in an area on an underside, or bottom surface, of the second module, and configured to complementarily align with, and couple to, the first interconnection interface component when the second module is stacked directly on top of the first module. In some implementations, complementary interconnection interface components may include complementary magnets and/or the like, which may assist with securing the modules to one another when the modules are stacked upon one another.

In some implementations, an interconnection interface component (and/or any other interface components associated with electrical power and/or data connectivity) may be configured to be resilient to environment substances (e.g., dust, moisture, liquids, and/or the like). In some implementations, a module may include a protection mechanism for protecting (e.g., covering) an interconnection interface component when the interconnection interface component is not in use. For example, the protection mechanism may be configured as a folding door and/or the like that, when positioned in a closed state, tightly encloses the interconnection interface component to protect the interconnection interface component from environmental contaminants.

In some implementations, a module may include one or more additional interface components for electrical power and/or data connectivity as needed. For example, in a case where a module needs to be located away from other stacked modules, the module may, in addition to an interconnection interface component disposed in an area on a topside or an underside of the module, further include one or more additional interface components disposed elsewhere on the module (e.g., on a backside of the module) to enable electrical power connection and/or data connectivity via other mechanisms (e.g., wires and/or the like). In some implementations, the module may be configured to couple to a power base (e.g., as shown in FIG. 1A) with design aesthetics similar to those of the module.

In some implementations, the modules may be configured to communicate with one another over wireless connections (e.g., via near-field communications (NFC) protocols and/or the like). In such cases, the modules may or may not include the above-described interconnection interface components.

Figure 1F:
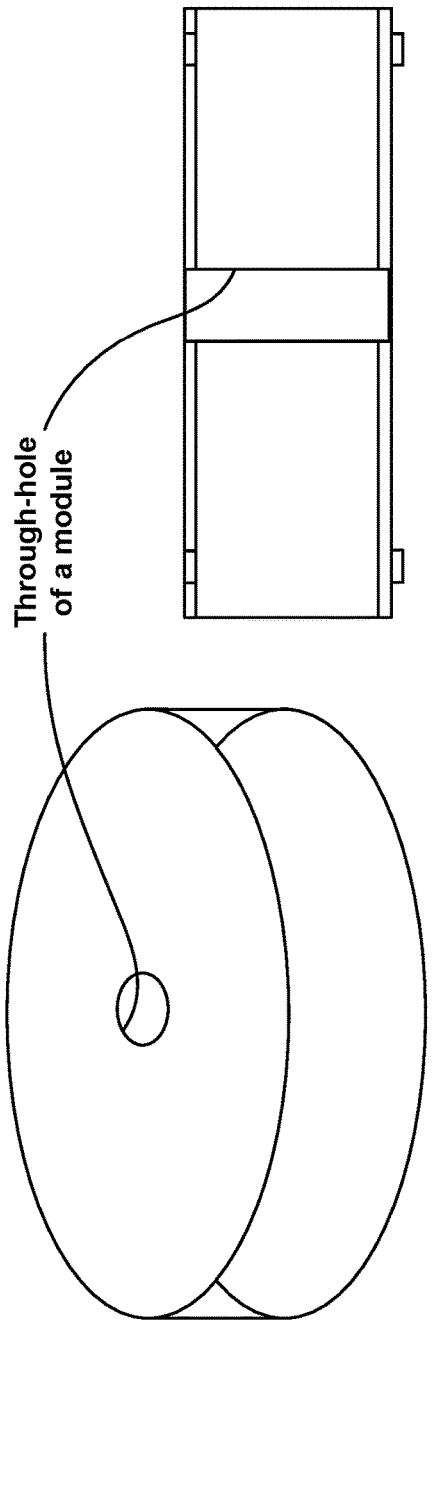

Stacking of modules (e.g., in a vertical arrangement) may subject the modules to overheating. Thus, in some implementations, one or more modules may be configured with heat dissipation features. FIG. 1F is a diagram of an example module configured with a through-hole that extends from an underside of the module to a topside of the module. In some implementations, multiple modules may each include such a through-hole or other air cooling features. In such cases, when the modules are stacked upon one another, the respective through-holes may align with one another to form a passageway (e.g., a chimney) that permits heat, generated at the modules, to dissipate upward into the atmosphere. In some implementations, a through-hole may be defined in a conductive core of a module (e.g., a circumference of the through-hole may be composed of one or more conductive materials, such as aluminum, copper, and/or the like), which may further facilitate the transfer of heat through the through-hole.

Figure 1G:
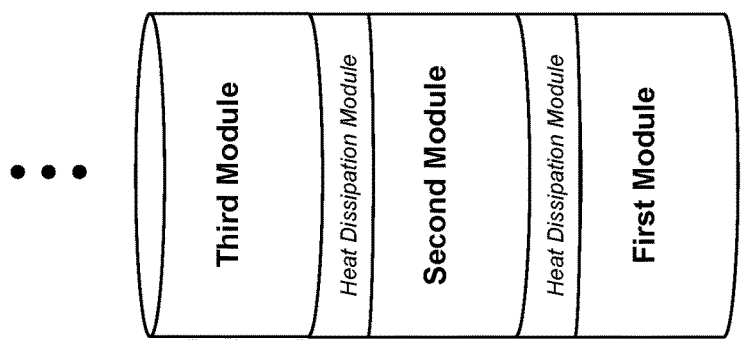

Additionally, or alternatively, a module may include a conductive surface (e.g., a top plate, a bottom plate, a side plate, and/or the like composed of aluminum, copper, and/or the like), one or more vents disposed in a housing of the module, conductive contact elements (e.g., gold contacts for electrical power and/or data interconnects), and/or the like, which may facilitate heat dissipation into the atmosphere. In some implementations, and as shown in FIG. 1G, one or more heat dissipation modules (e.g., composed of aluminum, copper, and/or the like) may be disposed between modules and/or on top of or below modules that may need additional heat dissipation.

In some implementations, a module (e.g., a base, or foundational, module positioned at a lowest position in a stack) may include one or more feet, on an underside, or bottom surface, of the module, configured to raise the module, which may facilitate additional heat dissipation and air flow. In various implementations, one or more other modules may also similarly include feet, such that there exist gaps between all the modules when the modules are stacked upon one another, thereby facilitating heat dissipation and air flow.

Figure 1H:
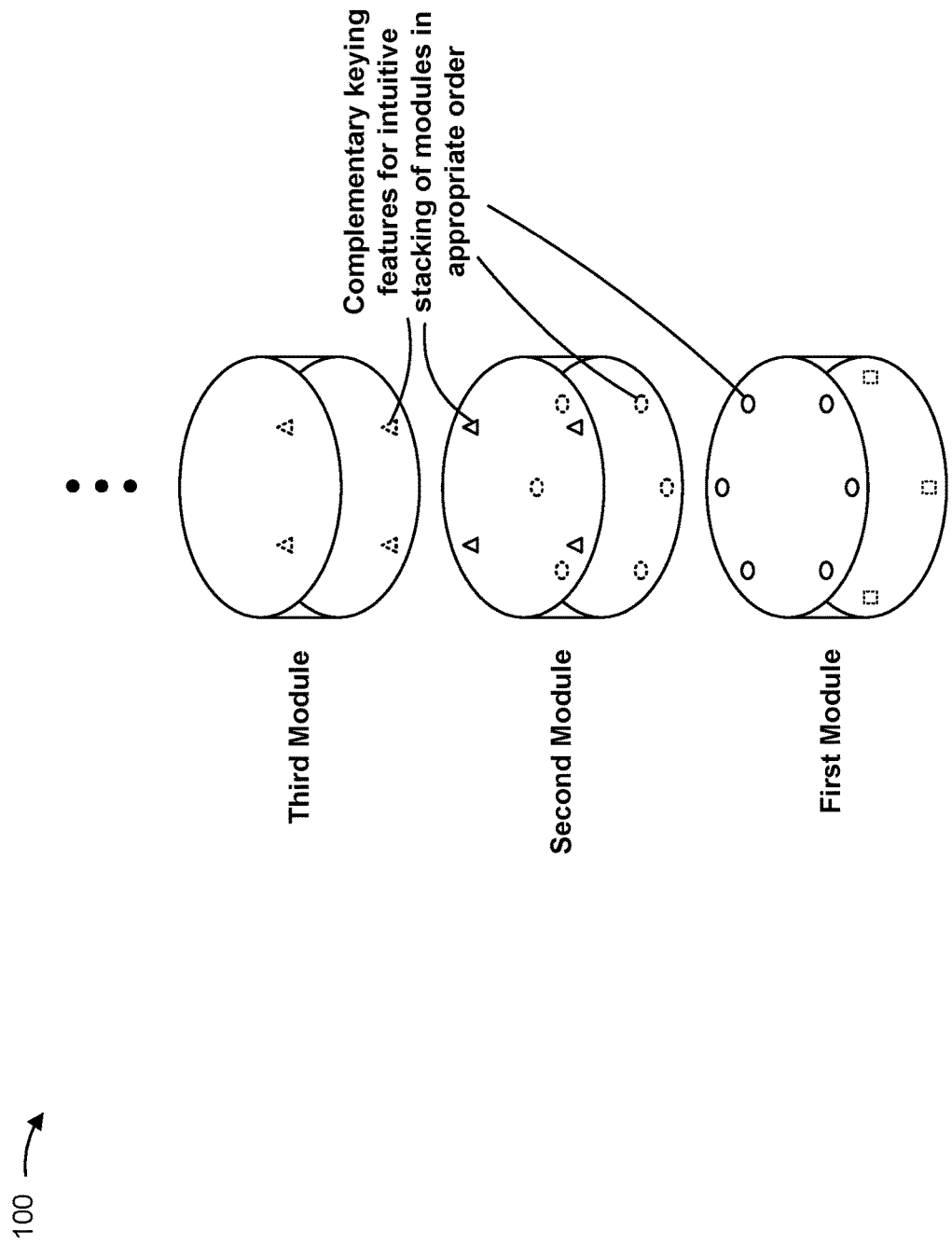

In some implementations, the modules may be configured to enable user-friendly assembly and/or connection. FIG. 1H is a diagram of example modules that include complementary keying features formed on, or provided to, the modules. As shown in FIG. 1H, a first module may include a first set of underside keying features on an underside of the first module (e.g., provided as feet for the first module), and a first set of topside keying features on a topside of the first module (e.g., formed as recesses, holes, and/or the like). As further shown in FIG. 1H, a second module may include a second set of underside keying features, on an underside of the second module, that may align with, and complementarily couple to, the first set of topside keying features of the first module when the second module is stacked over the first module. As further shown, the second module may also include a second set of topside keying features on a topside of the second module. As further shown, a third module may include a third set of underside keying features, on an underside of the third module, that may align with, and complementarily couple to, the second set of topside keying features of the second module when the third module is stacked over the second module, and so on. In this way, modules may be configured with keying features to enable subscriber self-installation (e.g., stacking of the modules in an appropriate order) that is simple and intuitive.

It is to be appreciated that any of the modules, described herein, may be utilized as a standalone module (e.g., not included in a stack of modules) regardless of the keying features included in the module. Further, in some implementations, and in a case where one or more heat dissipation modules are to be included in a CPE device configuration, the heat dissipation module(s) may include keying features that enable coupling of the heat dissipation module(s) to one or more modules of the CPE device. For example, if a first module, of the CPE device, has a topside with a pattern of recesses, and if a second module, of the CPE device, has an underside with a corresponding pattern of feet, a heat dissipation module, to be disposed between the first module and the second module in a stacked configuration, may have a topside with a corresponding pattern of recesses (e.g., for complementarily coupling to the feet of the second module) and an underside with a corresponding pattern of feet (e.g., for complementarily coupling to the recesses of the first module).

A CPE device that includes a large quantity of modules (e.g., up to seven or more stacked modules, as shown in FIG. 1A) may consume a considerable amount of space and/or may be less aesthetically-pleasing. Thus, in some implementations, the functionalities of two or more of such modules may be merged into a single module, or may be made available as add-on services, which reduces a quantity of modules that need to be installed at a given premises, and simplifies keying of the modules for purposes of stacking.

In some implementations, a CPE device may include three main modules (e.g., a WAN module, a router module, and a WLAN module), where one or more of the main modules may be configured to receive additional modules (e.g., add-on, or micro, modules) to extend the functionality of, or provide additional functionality to, the main modules. In some implementations, an additional module may be configured to plug into a corresponding main module (e.g., as a plug-and-play device). As an example, rather than providing a storage module as part of a stack (e.g., as shown in FIG. 1A), storage capacity may be included in a main module (e.g., a router module), or provided to the main module, in the form of a plug-and-play memory disk and/or the like.

In some implementations, a module (e.g., a WAN module, a WLAN module, and/or the like) may include a trusted element configured to encrypt communication exchanges, and identify, to another module (e.g., a router module), that the module is a trusted entity. This may ensure secure communications, between modules of a CPE device, on an open electronic bus structure. In some implementations, a trusted element may be contained in a processing component (e.g., a microcontroller, a microprocessor, and/or the like) or may be implemented as an external device that is connected to the processing component (e.g., via an interface, such as the I$^2$C interface and/or the like).

In some implementations, the router module may be configured with various interfaces, including, for example, a WAN connection, one or more LAN connections, a Multimedia over Coax Alliance (MoCA) connection, a powerline connection and/or a radio frequency (RF) connection, and/or one or more voice line interfaces. In some implementations, the router module may support one or more add-on modules, including, for example, storage module(s) (e.g., memory disks and/or the like), IoT module(s), and/or the like.

In some implementations, the router module may include a WAN connection configured to communicatively couple to a WAN module. For example, in some implementations, the WAN connection may be implemented as an interconnection interface component (e.g., as described above). In some implementations, the router module may include a small form-factor pluggable (SFP) and/or an SFP+ connection configured to communicatively couple to fiber channels and/or cables. In some implementations, the WAN connection may be configured to support the Institute of Electrical and Electronics Engineers (IEEE) 802.11bz specification.

In some implementations, the one or more LAN connections may include at least four LAN Ethernet connections. In some implementations, the LAN connection may also be configured to support the IEEE 802.11bz specification.

In some implementations, the MoCA connection may be configured to support the MoCA Alliance 2.5 specification, MoCA 3, and/or the like. In some implementations, the MoCA connection may be configured to support high speed connection speeds (e.g., 10 gigabits per second (Gbps) and/or the like), and WAN and/or LAN connectivity. In cases where radio frequency (RF) is used for video distribution, and a PON-based WAN module is being used to interconnect with the router module, the router module may be configured to pass through RF video. In such cases, a coaxial connection of the router module may be a permanent (or fixed) coaxial connection (and not a modular connection).

In some implementations, the voice line interface(s) may support at least a single or dual voice subscriber line interface circuit (SLIC). In some implementations, voice services may be standardized across multiple service segments (e.g., via a voice over long-term evolution (VoLTE) core).

In some implementations, the router module may include one or more memory disk slots configured to receive add-on memory disk(s) and/or the like. As an example, a memory disk slot may include a solid-state drive (SSD)-based memory disk (e.g., a 2.5" SSD disk slot configured to support Serial Advanced Technology Attachment (SATA) III and/or the like).

In some implementations, the router module may be configured to support one or more add-on IoT modules (e.g., one or more IoT modules based on Z-Wave, ZigBee, Thread, Bluetooth Low Energy (BLE), IEEE 802.11ah, and/or the like).

Figure 1I:
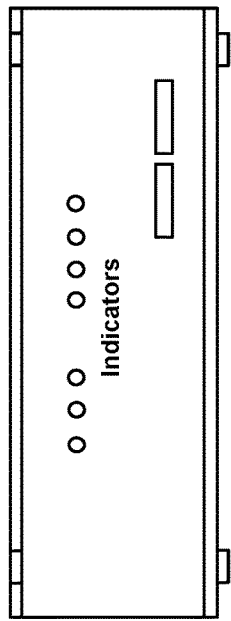

FIG. 1I is a diagram of a front portion of an example module (e.g., a WAN module, a router module, a WLAN module, and/or the like). As shown in FIG. 1I, the module may include multiple indicators (e.g., indicator lights and/or the like), disposed in the front portion of the module, configured to provide status information relating to the module (e.g., module performance information, module connectivity availability information, and/or the like).

Figure 1J:
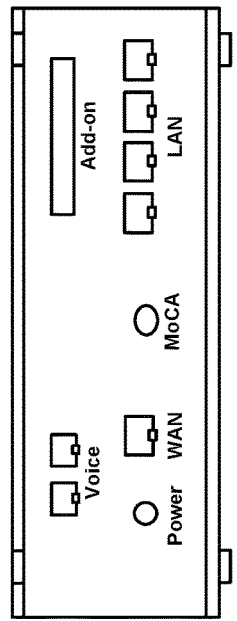

FIG. 1J is a diagram of a rear portion of an example router module. As shown in FIG. 1J, the router module may include various interface connections, including for connection to electrical power, a WAN connection, a MoCA connection, and/or the like.

In some implementations, the WAN module may be implemented as a PON-based WAN module, a 5G-based WAN module, a Data Over Cable Service Interface Specification (DOCSIS)-based WAN module, and/or the like.

In some implementations, and in cases where the WAN module is a 5G-based WAN module, such as a 5G fixed wireless modem, where power requirements may be high (e.g., greater than or equal to 45 Watts), the WAN module may be used as a standalone module (e.g., not to be included with other stacked modules).

In some implementations, the WAN module may be configured to support high speed data connectivity (e.g., full duplex 10 Gbps/10 Gbps data connectivity and/or the like). In some implementations, the WAN module may include multiple slots configured to receive add-on modules—e.g., a primary WAN module, a secondary WAN module, and/or the like. In some implementations, the slots may have different sizes, which may prevent insertion of an improper add-on module into a slot. In some implementations, the primary WAN module may be configured to support an optical network terminal (ONT). For example, the primary WAN module may be configured to support a PON, a gigabit PON ("GPON"), a NGPON, an NGPON2, and/or the like. In some implementations, the secondary WAN module may be configured to support a cellular network (e.g., a long-term evolution (LTE) network, a code division multiple access (CDMA) network, a Third Generation (3G) network, a 4G network, a 5G network, and/or another type of next generation network), which may provide a backup connection in an event that a connection associated with the primary WAN module is down or unavailable.

Figure 1K:
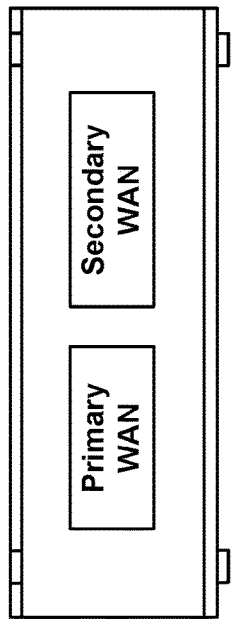

FIG. 1K is a diagram of a rear portion of an example WAN module. As shown in FIG. 1K, the WAN module may include various interface slots, including for a primary WAN module and a secondary WAN module.

As described above, in some implementations, a WLAN module may be included in a stack (e.g., at the top, uppermost position, of a stack), or installed as a standalone module in a location separate from stacked modules, which permits a subscriber to flexibly configure a distributed network for improved network connectivity as needed.

In some implementations, the WLAN module may be configured to provide data connectivity for user devices (e.g., computer devices, laptop devices, smartphone devices, tablet devices, and/or the like), and may be configured to support one or more add-on modules. In some implementations, the WLAN module may include one or more LAN connections (e.g., LAN Ethernet connections and/or the like). In some implementations, the WLAN module may include a MoCA connection configured to provide a wired backhaul as needed.

Figure 1L:
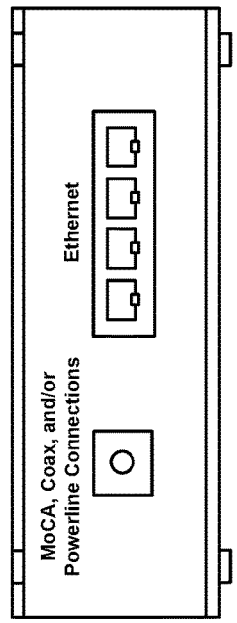

FIG. 1L is a diagram of a rear portion of an example WLAN module. As shown in FIG. 1L, the WLAN module may include various interface connections, including LAN Ethernet connections, powerline communication connections, and/or MoCA/coaxial connections.

In this way, a network service provider may utilize a converged solution for WAN implementations across multiple service segments (including, for example, fiber optic-based Internet service, 5G fixed wireless service, network services for small companies and/or medium-sized companies, and/or the like). In addition to providing an aesthetically-pleasing, in-premises network equipment system configuration, a modular approach, as described herein, also permits customized configurations that more effectively tailor to the needs of subscribers in different service segments. For example, a CPE device configuration may include only the modules needed by a particular subscriber (e.g., based on services to which the particular customer is subscribed), which provides more efficient and reliable network system implementations over existing approaches, where a subscriber may be provided with equipment that has functionality for services to which the subscriber is not subscribed or may never use. This also permits a network service provider to offer flexible options for different network service installations, which improves overall market penetration for the network service provider. This also permits a subscriber to continue to add (e.g., grow into) advanced services over time, without a need for equipment replacements (e.g., the subscriber may only need additional modules that provide such advanced services, and that may work with the subscriber's existing equipment system configuration or setup).

Modularity in network equipment design also provides economies of scale that flexibly accommodate a wide range of subscriber needs. For example, providing a particular type of network functionality, to different subscribers in different service segments, via the same module (rather than via different devices dedicated for different service segments, as is done in existing approaches), reduces network equipment variations, which simplifies, and improves the efficiency of, equipment inventory tracking, management, support, and deployment. Providing a modular CPE device, as described herein, also affords a network service provider with more flexibility in managing the life cycle of the various modules, including updating and/or replacing individual modules to keep up to date with advancing technologies, which also improves equipment maintenance and upgrade cycles. Modularity in network equipment design also permits a network service provider to develop, and utilize, a common BSS, a common OSS, a common telemetry solution, and/or a common surveillance solution, across all service segments, which promotes synergy between service segment operations, thereby improving the overall efficiency and reliability of the network service provider's systems.

As indicated above, FIGS. 1A-1L are provided merely as examples. Other examples are possible and may differ from what was described with regard to FIGS. 1A-1L.

For example, in practice, there may be additional devices and/or components, fewer devices and/or components, different devices and/or components, or differently arranged devices and/or components than those variously shown in FIGS. 1A-1L. Furthermore, two or more devices and/or components shown in one or more of FIGS. 1A-1L may be implemented within a single device and/or component, or a single device and/or component shown in one or more of FIGS. 1A-1L may be implemented as multiple, distributed devices and/or components.

As another example, although some implementations are described herein as involving side-by-side stacking, or arrangements, of modules in a vertical direction (e.g., where an underside of a module is disposed on a topside of another module), other arrangements are possible, such as, for example, a side-by-side configuration of modules in a horizontal direction (e.g., where the modules are juxtaposed).

Figure 2:
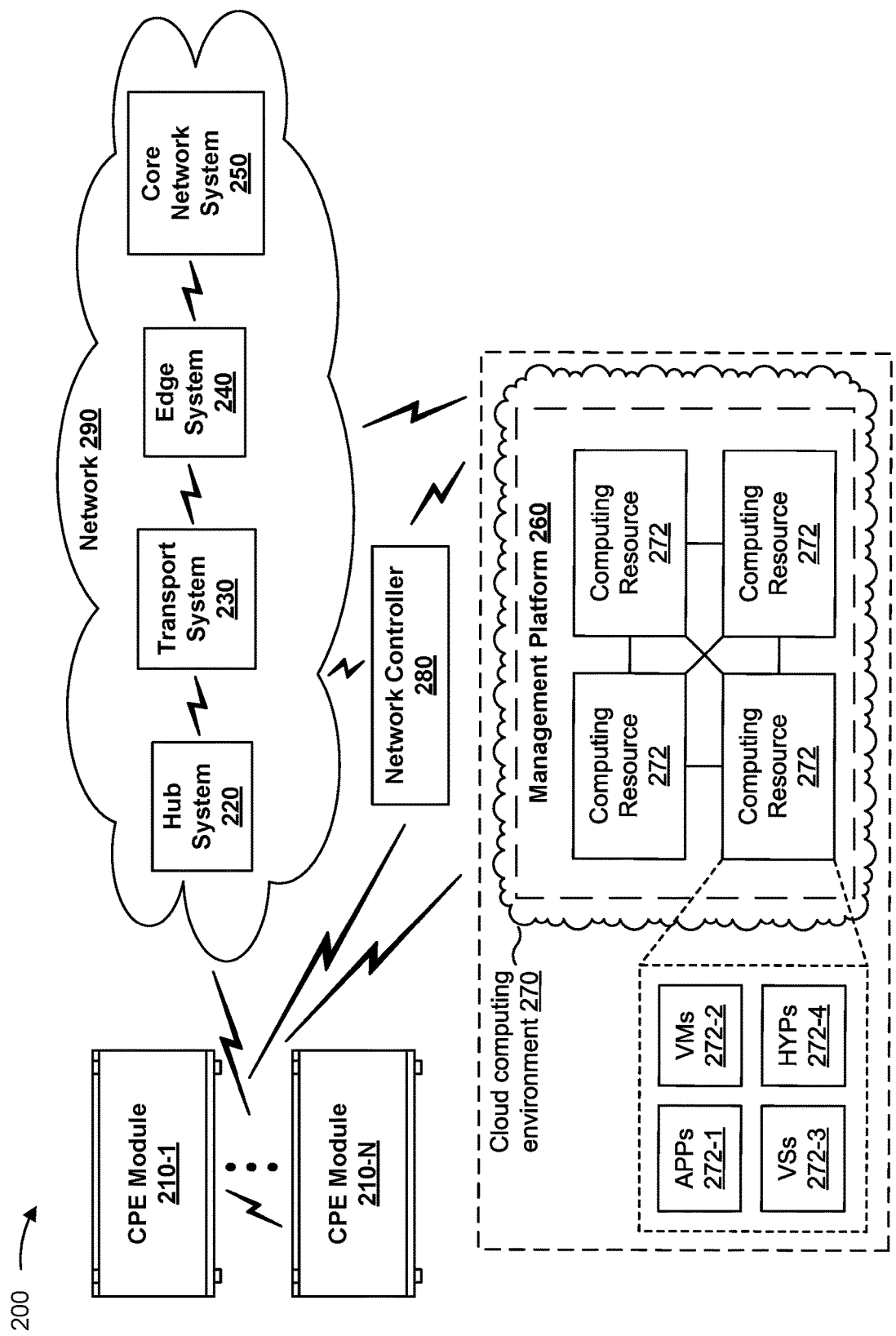
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more CPE modules 210-1 through 210-N (N≥1) (hereinafter referred to collectively as "CPE modules 210," and individually as "CPE module 210"), a hub system 220, a transport system 230, an edge system 240, a core network system 250, a management platform 260, a network controller 280, and a network 290. Devices of environment 200 may interconnect via wired connections, wireless connections, or a combination of wired and wireless connections.

CPE module 210 includes one or more devices capable of receiving, generating, storing, processing, and/or providing data associated with hub system 220, transport system 230, edge system 240, core network system 250, management platform 260, and/or network controller 280. For example, CPE module 210 may include a hardware device located at a subscriber's premises (e.g., a residential home, a multiple dwelling unit, a business building, and/or the like), such as a router module, a WAN module, a WLAN module, a voice services module, an IoT module, a storage module, a femtocell module, a micro cell module, a picocell module, a video module, a digital assistant module, a content recorder device (e.g., a digital video recorder and/or the like), and/or the like. In some implementations, a CPE module 210 may host a containerized system that includes containers in which applications (e.g., service applications) may be instantiated. In some implementations, CPE module 210 may be communicatively coupled to hub system 220 via wired connections (e.g., based on fiber (e.g., such as in a PON, an NGPON, and NGPON2, and/or the like), based on copper (e.g., such as in an Ethernet network and/or the like) or wireless connections.

Hub system 220 includes one or more devices capable of receiving, generating, storing, processing, and/or providing data associated with CPE module 210, transport system 230, edge system 240, core network system 250, management platform 260, and/or network controller 280. For example, hub system 220 may include one or more computing devices, server devices, routers, switches, firewalls, and/or the like for exchanging data between CPE module 210 and transport system 230. In some implementations, hub system 220 may include an access aggregation hub configured to aggregate traffic (e.g., received from, or destined to, CPE module 210) transmitted over different network types.

Transport system 230 includes one or more devices capable of receiving, generating, storing, processing, and/or providing data associated with CPE module 210, hub system 220, edge system 240, core network system 250, management platform 260, and/or network controller 280. For example, transport system 230 may include one or more computing devices, server devices, routers, switches, firewalls, and/or the like for exchanging data between hub system 220 and edge system 240. In some implementations, in a case where hub system 220 is implemented as an access aggregation hub, transport system 230 may be implemented as a unified transport system for traffic received from, or destined to, the access aggregation hub.

Edge system 240 includes one or more devices capable of receiving, generating, storing, processing, and/or providing data associated with CPE module 210, hub system 220, transport system 230, core network system 250, management platform 260, and/or network controller 280. For example, edge system 240 may include one or more computing devices, server devices, routers, switches, firewalls, and/or the like for exchanging data between transport system 230 and core network system 250. In some implementations, in a case where hub system 220 is implemented as an access aggregation hub, and transport system 230 is implemented as a unified transport system, edge system 240 may be implemented as a multi-service edge system (e.g., a regional hub) for routing and/or processing traffic received from, or destined to, the unified transport system. In some implementations, edge system 240 may be capable of supporting an ultra-long-haul (ULH) core network (e.g., a ULH Dense Wavelength Division Multiplexing (DWDM) transport optical network configured to carry Internet Protocol (IP), Multiprotocol Label Switching (MPLS), and Synchronous Optical Network/Synchronous Optical Hierarchy (SONET/SDH) services).

Core network system 250 includes one or more devices capable of receiving, generating, storing, processing, and/or providing data associated with CPE module 210, hub system 220, transport system 230, edge system 240, management platform 260, and/or network controller 280. For example, core network system 250 may include an MPLS core network, a ULH core network, and/or the like, and may include one or more computing devices, server devices, routers, switches, firewalls, and/or the like for exchanging data between edge system 240 and an external network (not shown). In some implementations, in a case where hub system 220 is implemented as an access aggregation hub, transport system 230 is implemented as a unified transport system, and edge system 240 is implemented as a multi-service edge system, core network system 250 may be implemented as a converged core system for routing and/or processing traffic received from, or destined to, the multi-service edge system.

Management platform 260 includes one or more devices capable of receiving, generating, storing, processing, and/or providing data associated with CPE module 210, hub system 220, transport system 230, edge system 240, core network system 250, and/or network controller 280. In some implementations, management platform 260 may include a provisioning and orchestration system and various support systems, including a BSS and an OSS.

Management platform 260 may include a server device or a group of server devices. In some implementations, as shown, management platform 260 can be hosted in cloud computing environment 270. For example, management platform 260 may be implemented as a cloud-based platform in edge system 240. Notably, while implementations described herein describe management platform 260 as being hosted in cloud computing environment 270, in some implementations, management platform 260 is not cloud-based or can be partially cloud-based.

Cloud computing environment 270 includes an environment that delivers computing as a service, whereby shared resources, services, etc. can be provided to CPE module 210 and/or one or more other management platforms 260. Cloud computing environment 270 can provide computation, software, data access, storage, and/or other services that do not require end-user knowledge of a physical location or low latency requirements and configuration of a system and/or a device that delivers the services. As shown, cloud computing environment 270 can include a set of computing resources 272.

Computing resource 272 includes one or more personal computers, workstation computers, server devices, or another type of computation and/or communication device. In some implementations, computing resource 272 can host management platform 260. In some implementations, cloud resources can include compute instances executing in computing resource 272, storage devices provided in computing resource 272, data transfer devices provided by computing resource 272, etc. In some implementations, computing resource 272 can communicate with other computing resources 272 via wired connections, wireless connections, or a combination of wired and wireless connections.

As further shown in FIG. 2, computing resource 272 can include a group of cloud resources, such as one or more applications ("APPs") 272-1, one or more virtual machines ("VMs") 272-2, virtualized storage ("VSs") 272-3, one or more hypervisors ("HYPs") 272-4, and/or the like.

Application 272-1 includes one or more software applications that can be provided to or accessed by CPE module 210. Application 272-1 can eliminate a need to install and execute the software applications on CPE module 210. For example, application 272-1 can include software associated with management platform 260 and/or any other software capable of being provided via cloud computing environment 270. In some implementations, one application 272 1 can send/receive information to/from one or more other applications 272-1, via virtual machine 272-2.

Virtual machine 272-2 includes a software implementation of a machine (e.g., a computer) that executes programs like a physical machine. Virtual machine 272-2 can be either a system virtual machine or a process virtual machine, depending upon use and degree of correspondence to any real machine by virtual machine 272-2. A system virtual machine can provide a complete system platform that supports execution of a complete operating system (OS). A process virtual machine can execute a single program, and can support a single process. In some implementations, virtual machine 272-2 can execute on behalf of a user (e.g., CPE module 210) and/or on behalf of one or more other management platforms 260, and can manage infrastructure of cloud computing environment 270, such as data management, synchronization, or long-duration data transfers.

Virtualized storage 272-3 includes one or more storage systems and/or one or more devices that use virtualization techniques within the storage systems or devices of computing resource 272. In some implementations, within the context of a storage system, types of virtualizations can include block virtualization and file virtualization. Block virtualization can refer to abstraction (or separation) of logical storage from physical storage so that the storage system can be accessed without regard to physical storage or heterogeneous structure. The separation can permit administrators of the storage system flexibility in how the administrators manage storage for end users. File virtualization can eliminate dependencies between data accessed at a file level and a location where files are physically stored. This can enable optimization of storage use, server consolidation, and/or performance of non-disruptive file migrations.

Hypervisor 272-4 provides hardware virtualization techniques that allow multiple operating systems (e.g., "guest operating systems") to execute concurrently on a host computer, such as computing resource 272. Hypervisor 272-4 can present a virtual operating platform to the guest operating systems, and can manage the execution of the guest operating systems. Multiple instances of a variety of operating systems can share virtualized hardware resources.

Network controller 280 includes one or more devices capable of receiving, generating, storing, processing, and/or providing data associated with CPE module 210, hub system 220, transport system 230, edge system 240, core network system 250, and/or management platform 260. For example, network controller 280 may include one or more computing devices, server devices, routers, switches, firewalls, and/or the like. In some implementations, network controller 280 may communicate with management platform 260 and CPE module 210 to facilitate provisioning of services and/or deployment of corresponding service applications to CPE module 210. In some implementations, network controller 280 may include telemetry functions associated with the services.

Network 290 includes one or more wired and/or wireless networks. For example, network 290 may include a cellular network (e.g., an LTE network, a CDMA network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices, systems, and networks shown in FIG. 2 are provided as an example. In practice, there may be additional devices, systems, and/or networks, fewer devices, systems, and/or networks, different devices, systems, and/or networks, or differently arranged devices, systems, and/or networks than those shown in FIG. 2. Furthermore, two or more devices and/or systems shown in FIG. 2 may be implemented within a single device and/or system, or a single device and/or system shown in FIG. 2 may be implemented as multiple, distributed devices and/or systems. Additionally, or alternatively, a set of devices and/or systems (e.g., one or more devices and/or systems) of environment 200 may perform one or more functions described as being performed by another set of devices and/or systems of environment 200.

FIG. 3 is a diagram of example components of a device 300. Device 300 may correspond to CPE module 210, hub system 220, transport system 230, edge system 240, core network system 250, management platform 260, and/or network controller 280. In some implementations, CPE module 210, hub system 220, transport system 230, edge system 240, core network system 250, management platform 260, and/or network controller 280 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, an actuator, and/or image sensor(s) (e.g., camera(s))). Output component 360 includes a component that provides output information from device 300 (e.g., a display, a speaker, haptic feedback, and/or one or more LEDs).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, a powerline interface, an infrared interface, a radio frequency (RF) interface, a universal serial bus (USB) interface, a wireless local area network interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

In this way, a network service provider may utilize a converged solution for WAN implementations across multiple service segments (including, for example, fiber optic-based Internet service, 5G fixed wireless service, network services for small companies and/or medium-sized companies, and/or the like). In addition to providing an aesthetically-pleasing, in-premises network equipment system configuration, a modular approach, as described herein, also permits customized configurations that more effectively tailor to the needs of subscribers in different service segments. For example, a CPE device configuration may include only the modules needed by a particular subscriber (e.g., based on services to which the particular customer is subscribed), which provides more efficient and reliable network system implementations over existing approaches, where a subscriber may be provided with functionality for services to which the subscriber is not subscribed or may never use. This also permits a network service provider to offer flexible options for different network service installations, which improves overall market penetration for the network service provider.

Modularity in network equipment design also provides economies of scale that flexibly accommodate a wide range of subscriber needs. For example, providing a particular type of network functionality, to different subscribers in different service segments, via the same module (rather than via different devices dedicated for different service segments, as is done in existing approaches), reduces network equipment variations, which simplifies, and improves the efficiency of, equipment inventory tracking, management, support, and deployment. Providing a modular CPE device, as described herein, also affords a network service provider with more flexibility in managing the life cycle of the various modules, including updating and/or replacing individual modules to keep up to date with advancing technologies, which also improves equipment maintenance and upgrade cycles. Modularity in network equipment design also permits a network service provider to develop, and utilize, a common BSS, a common OSS, a common telemetry solution, and/or a common surveillance solution, across all service segments, which promotes synergy between service segment operations, thereby improving the overall efficiency and reliability of the network service provider's systems.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

To the extent the aforementioned embodiments collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A device, comprising:
    a first module, configured to communicatively couple to a network, including a set of topside keying features arranged in a first pattern; and
    a second module, configured to communicatively couple to the first module and further configured to provide a network routing function, including:
        a set of underside keying features, arranged in the first pattern, such that the set of underside keying features of the second module are complementary to the set of topside key features of the first module, and
        a set of topside keying features, arranged in a second pattern different from the first pattern, complementary to a set of underside keying features, of a third module, arranged in the second pattern,
    wherein the first module comprises a first through-hole and the second module comprises a second through-hole aligned with the first through-hole.

2. The device of claim 1, wherein the set of underside keying features of the second module are complementary to the set of topside keying features of the first module to facilitate arrangement of the first module and the second module in a side-by-side configuration.

3. The device of claim 2, wherein the side-by-side configuration includes a vertically-oriented configuration or a horizontally-oriented configuration.

4. The device of claim 1, wherein each of the first module and the second module includes a first interconnection interface component, and
    wherein the first interconnection interface component of the first module is configured to complementary interconnect with the first interconnection interface component of the second module.

5. The device of claim 4, wherein the second module includes a second interconnection interface component for the third module.

6. The device of claim 5, wherein the first interconnection interface component and the second interconnection interface component provide at least one of an electrical power transfer between the first module and the second module, or a data connectivity between the first module and the second module.

7. The device of claim 1, wherein the second module is a heat dissipation module.

8. The device of claim 1, wherein the device is a customer premises equipment device.

9. A system, comprising:
    a first device, configured to communicatively couple to a network, comprising:
        a first module including a set of topside keying features arranged in a first pattern; and
        a second module, configured to communicatively couple to the first module and further to provide network routing functions, including:
            a set of underside keying features, arranged in the first pattern, such that the set of underside keying features of the second module are complementary to the set of topside keying features of the first module, and
            a set of topside keying features arranged in a second pattern, different from the first pattern, to be complementary to a set of underside keying features, of a third module, arranged in the second pattern, wherein the first module comprises a first through-hole and the second module comprises a second through-hole aligned with the first through-hole.

10. The system of claim 9, further comprising:
a second device, configured to communicatively couple to the network, comprising:
   a third module including a set of underside keying features or a set of topside keying features; and
   a fourth module, configured to communicatively couple to the first module and further configured to provide network routing functions, including a set of underside keying features or a set of topside keying features,
      wherein the set of underside keying features of the fourth module are complementary to the set of topside keying features of the third module, or the set of topside keying features of the fourth module are complimentary to the set of underside keying features of the third module, to facilitate arrangement of the third module and the fourth module in a side-by-side configuration.

11. The system of claim 10, wherein the first device and the second device are located at a first subscriber's location and a second subscriber's premises, respectively.

12. The system of claim 9, further comprising at least one of a hub system, a transport system, an edge system, or a core network system is associated with the first module or the second module.

13. The system of claim 12, wherein the at least one of the hub system, the transport system, the edge system, or the core network system is configured to receive, generate, store, process, or provide data associated with the first module or the second module.

14. An in-premises network equipment system, comprising: a device comprising: a first module, configured to communicatively couple to a network, including a set of topside keying features arranged in a first pattern, and a second module, configured to communicatively couple to the first module and further to provide a network routing function, including: a set of underside keying features, arranged in the first pattern, such that the set of underside keying features of the second module aligns with the set of topside keying features of the first module when the second module is positioned over the first module, and a set of topside keying features, arranged in a second pattern, different from the first pattern, to align with a set of underside keying features, of a third module and arranged in the second pattern, when the third module is positioned over the second module, and wherein the first module comprises a first through-hole and the second module comprises a second through-hole aligned with the first through-hole.

15. The in-premises network equipment system of claim 14, wherein the set of underside keying features of the second module are complementary to the set of topside key features of the first module to facilitate arrangement of the first module and the second module in a side-by-side configuration.

16. The in-premises network equipment system of claim 14, wherein the first module and the second module are a first network equipment module and a second network equipment module, respectively.

17. The in-premises network equipment system of claim 14, wherein the set of underside keying features, of the second module, are located on and extend away from a bottom surface of the second module.

18. The in-premises network equipment system of claim 14, wherein each of the set of topside keying features of the first module is a female component, and wherein each of the set of underside keying features of the second module is a male component.

19. The in-premises network equipment system of claim 14, wherein the second module is a heat dissipation module.

20. The device of claim 1, wherein the third module is a wide area network (WAN) module or a wireless local area network (WLAN) module.

* * * * *